United States Patent [19]
Redman

[11] 3,896,982
[45] July 29, 1975

[54] WIRE SOLDER FEEDER

[76] Inventor: Glen R. Redman, 1303 Maple Dr., Alamogordo, N. Mex. 88310

[22] Filed: Mar. 28, 1974

[21] Appl. No.: 455,767

[52] U.S. Cl. ............................. 226/128; 226/151
[51] Int. Cl. ........................................... B65h 17/36
[58] Field of Search .......... 226/147, 149, 151, 158, 226/127, 128

[56] References Cited
UNITED STATES PATENTS

| | | | |
|---|---|---|---|
| 2,604,064 | 7/1952 | Sefton | 226/151 X |
| 2,821,947 | 2/1958 | Von Knaut | 226/151 X |
| 2,849,106 | 8/1958 | Hunt | 226/151 |
| 3,119,948 | 1/1964 | Baird | 226/149 X |

Primary Examiner—Richard A. Schacher
Attorney, Agent, or Firm—Joseph E. Rusz; Arsen Tashjian

[57] ABSTRACT

The inventive apparatus permits the feeding, as needed, of solder wire from a spool of coiled wire-type solder. This feeder is especially useful, and is most effective where the spool must be held by hand and the soldering must be accomplished in a work area where access space is limited and/or a large number of solder connections must be made, such as with regard to electronic equipment.

5 Claims, 2 Drawing Figures

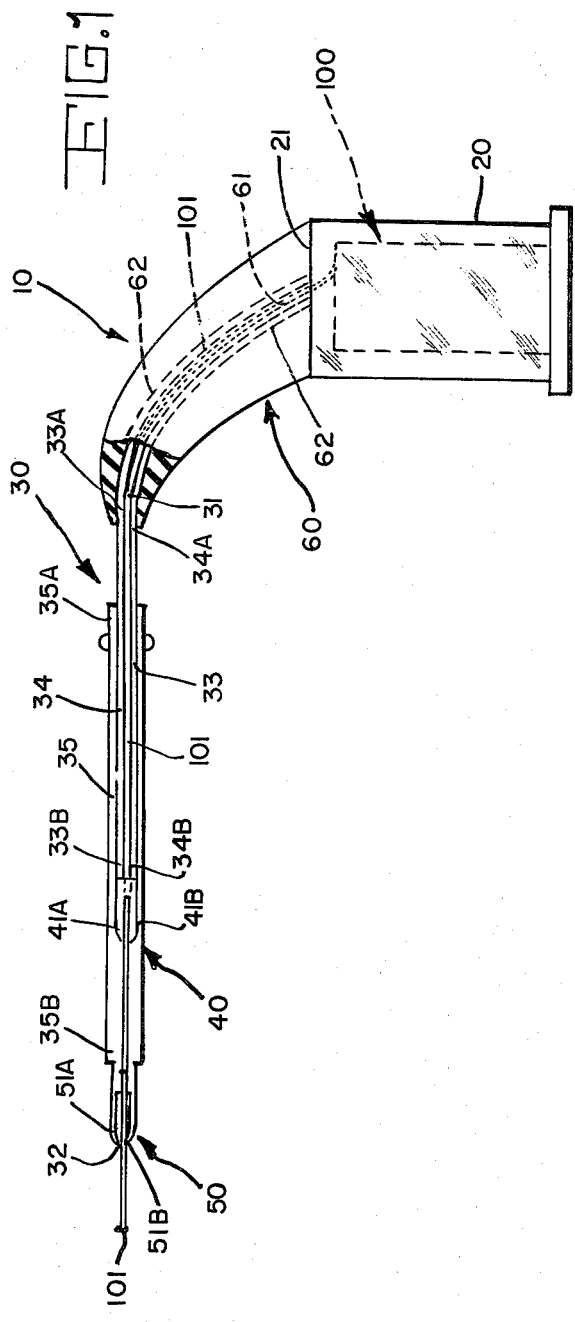
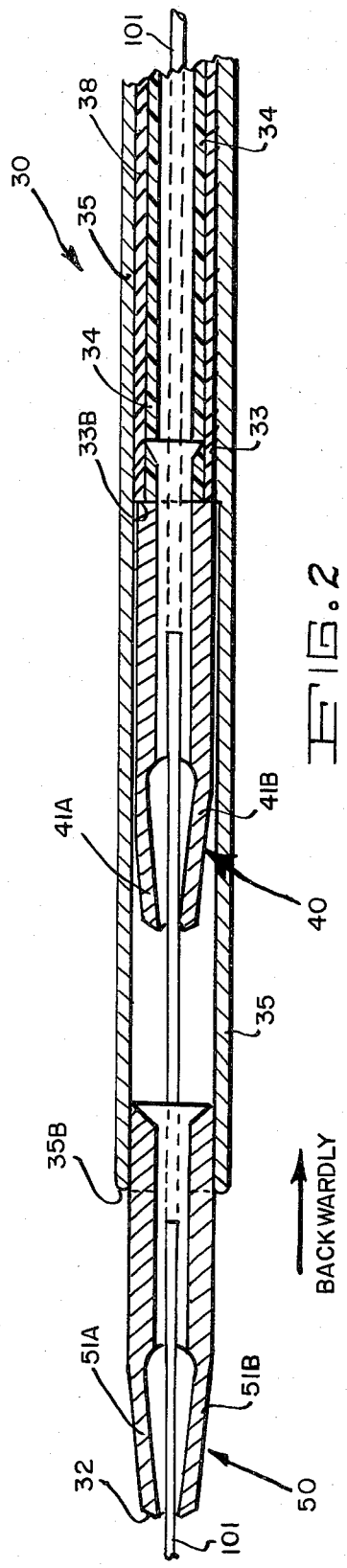

WIRE SOLDER FEEDER

BACKGROUND OF THE INVENTION

This invention relates to the solder art and, more particularly, to a feeder for that type of solder which is in wire form and which in its wire form invariably is coiled (i.e., is in a rolled form or "spooled").

Coiled wire-type solder per se is very well known in the art; and, its use is widespread in industry. Although the invention of coilable wire-type solder, and the coiling of said solder, were notable achievements in the art, coiled wire-type solder has distinct and severe disadvantages when the coil is to be held and used manually and the soldering is to be accomplished with regard to present-day electronic components and equipment. Where such is the case, the situation is consistently characterized by two factors, to wit: access space is limited, and a large number of soldering connections are to be made. The use or attempted use of coiled wire-type solder under such circumstances presents such great problems, which are so manifest and so well-known in the art, that their cataloging here would not serve any useful purpose.

I have invented a simple, low cost, compact, easily-useable feeder assembly for use in feeding the typical coiled wire-type solder, with said assembly being especially useful in a work area where space is limited, and where a large number of solder connections are to be made, and also where the coil or spool of solder must be hand-held. I, thereby, have eliminated the great disadvantages of the use of said type solder in that environment; and, I have, therefore, significantly advanced the state-of-the-art.

SUMMARY OF THE INVENTION

This invention pertains to a wire feeder assembly which is adapted for feeding coiled wire-type solder to a work area.

The principal object of this invention is to permit the effective use of coiled wire-type solder even in a work area where space is limited, where a large number of solder connections are to be made, and where the solder wire coil or spool must be manually held.

The principal object, and other objects and ones related thereto, of this invention will become readily apparent after a consideration of the description of the invention and reference to the drawings.

DESCRIPTION OF THE DRAWINGS

FIG. 1 is a side elevation view, in schematic form and partially in cross section, of a preferred embodiment of my invention; and, FIG. 2 is a side elevation view, in schematic form, which is enlarged and is cross-sectioned, of a major component portion of my invention.

DESCRIPTION OF THE PREFERRED EMBODIMENT

With reference to FIG. 1, therein are shown the preferred embodiment of my invention 10 and to assist in the description of the manner of operation of the embodiment, a typical spool of coiled wire-type solder 100, as it would be positioned in association with the embodiment 10 while being used.

Still with reference to FIG. 1, the embodiment 10 includes: a container 20, preferably of transparent material, for housing the supply (i.e. the spool) of coiled wire-type solder 100, with the container 20 having an outlet 21 for permitting the free passage of the wire-type solder 100 therefrom; and, a holding, guiding, and dispensing subassembly, generally designated by the reference numeral 30, having a first end 31 and a second end 32, with the first end of the subassembly 30 removably connected to the outlet 21 of the container 21 by suitable means, and with the subassembly 30 adapted to receive the wire-type solder 100 and to permit the free passage, by withdrawal, of the wire-type solder 100 (or, more precisely, of an uncoiled "strand" thereof, such as "straightened" representative solder wire 101) therethrough.

Again with reference to FIG. 1, the holding, guiding, and dispensing subassembly 30 (hereinafter referred to as the "subassembly") includes: a "fixed" (i.e., a stationary) hollow metallic tube 33, preferably made of brass, having a first end 33A and a second end 33B; a hollow tube liner 34 of non-abrasive material, preferably of "Teflon" or of other synthetic resin polymer material, with the liner 34 having a first end 34A and a second end 34B, and disposed internal of, and adjacent to, the stationary hollow metallic tube 33; a hollow metallic tube 35, preferably made of brass, having a first end 35A and a second end 35B, and disposed external of, adjacent to, and slideably movable on, the stationary hollow metallic tube 33; means 40 for gripping, for pulling (i.e., withdrawing), and for preventing the return of the wire-type solder wire, such as representative solder wire 101, from the container 20 and through the stationary hollow metallic tube 33, with said means 40 removably positioned at the second end 33B of the stationary hollow metallic tube 33; and, means 50 for gripping, pulling, preventing the return of, and holding the solder wire 101 ready for, and while, being used, with this means 50 removably positioned at the second end 35B of the movable hollow metallic tube 35.

In the interest of simplicity, and to avoid any confusion, means 40 will be referred to as the "first means" and means 50 will be referred to as the "second means."

Yet with reference to FIG. 1, also shown therein is a suitable means 60 for releasably connecting the subassembly 30 to the container 20, with said means 60 located intermediate (i.e., interposed between) the first end 31 of the subassembly 30 and the outlet 21 of the container 20. Means 60 has a solder wire passageway 61 therethrough preferably lined with a non-abrasive material 62, i.e., a synthetic resin polymer, such as "Teflon." Alternatively, the entire means 60 may be made of non-abrasive material with a suitable passageway therethrough.

Also shown in FIG. 1 are: oppositely disposed and complementary jaws 41A and 41B of first means 40, which said jaws are removably positioned at the second end 33B of the stationary hollow metallic tube 33; and, oppositely disposed and complementary jaws 51A and 51B of second means 50, which said jaws are removably positioned at the second end 35B of the movable hollow metallic tube 35.

With reference to FIG. 2, therein can easily be seen a partially fragmented portion of the subassembly 30 of my preferred embodiment 10 shown in FIG. 1. Some of the constituent components of subassembly 30 which are shown are: the external slideably movable hollow metallic tube 35, the internal stationary hollow metallic tube 33, and the hollow tube liner 34. Also shown are:

a representative solder wire 101 from the spool of coiled wire-type solder 100; the first means 40, with complementary and oppositely disposed jaws 41A and 41B for gripping, pulling, and preventing the return of the solder wire 101 to the container 20; and, the second means 50, with complementary jaws 51A and 51B (and oppositely disposed), for gripping, pulling, preventing the return of, and holding the solder wire 101 ready for, or during, use.

MANNER OF OPERATION OF THE PREFERRED EMBODIMENT

The manner of operation of the preferred embodiment 10 of my invention is self-evident and is easily understood from the foregoing description of the preferred embodiment 10, coupled with reference to the drawings.

Succinctly, an initial length 101 of the coiled wire-type solder is unwound from the spool 100 and is "straightened." Then, the spool 100 is placed into the container 20 through outlet 21, with the straightened length 101 extending through the container outlet 21. The straightened length 101 is then passed through the passageway, such as 61, of the releasably connecting means, such as 60. Said means 60 is then releasably connected to the outlet 21 of the container 20 and to the first end 31 of subassembly 30, with solder wire 101 being passed through tube liner 34 and stationary hollow metallic tube 33, until solder wire 101 passes through first means 40 and jaws 41A and 41B and extends or protrudes beyond said jaws. Next, movable hollow metallic tube 35, with second means 50 connected at one terminus 35B thereof, is slid over stationary hollow metallic tube 33 and first means 40, and is slideably moved backwardly (as indicated by the labelled arrow in FIG. 2) until solder wire 101 passes through hollow tube 35, second means 50, and jaws 51A and 51B, and extends beyond said jaws and end 32 of the subassembly 30.

It is to be understood at this point that when solder wire 101 engages and is passed through jaws 41A, 41B, 51A and 51B there is a snug fit between the jaws and the solder wire, so that initially the solder wire must be manually pulled (or pushed) through the jaws to overcome the tight fit by and between the solder wire and the jaws and the grip of the jaws on the solder wire.

My invention is then ready for use.

After the protruding solder wire 101 is consumed by use, second means 50 and tube 35 are moved backwardly manually; and, since there is still an unused length of solder wire 101 remaining within jaws 51A and 51B and within movable tube 35, all that need be done to lengthen or to extend the useable length of solder wire protruding from end 32 and jaws 51A and 51B, is to slide the movable tube 35 backwardly, whereby the solder wire is gripped by jaws 51A and 51B. Then, by pulling or otherwise urging tube 35 and jaws 51A and 51B forwardly (i.e., to the left or the reader) a new length of solder wire 101 is pulled forwardly and replenishes the consumed length of solder wire. This procedure is repeated until the soldering is completed.

CONCLUSION

It is abundantly clear from all of the foregoing, and from the drawing herein, that the stated and desired principal object of my invention has been attained. In addition, related desirable objects (such as the structural simplicity of the invention, its compactness, the low cost of its manufacture, and its easy useability) are also achieved.

It is to be noted that, although there have been described the fundamental and unique features of my invention as applied to a particular preferred embodiment, various other embodiments, substitutions, additions, omissions, adaptations, and the like, will occur to, and can be made by, those of ordinary skill in the art, without departing from the psirit of my invention.

What I claim is:

1. A wire feeder assembly, adapted for feeding coiled wire-type solder to a work area, comprising:
   a. a transparent container, for housing a supply of coiled wire-type solder, having an outlet for permitting the free passage of the wire-type solder therefrom;
   b. a holding, guiding, and dispensing subassembly having a first end and a second end, with said first end of said subassembly being removably connected to said outlet of said container, wherein said subassembly is adapted to receive the wire-type solder and to permit the free passage of the wire-type solder therethrough, and wherein said subassembly includes:
      1. a stationary hollow metallic tube having a first end and a second end;
      2. a hollow tube liner of non-abrasive material, having a first and a second end, and disposed internal of, and adjacent to, said stationary hollow metallic tube;
      3. a hollow metallic tube, having a first end and a second end, with said tube disposed external of, adjacent to, and slideably movable on, said stationary hollow metallic tube;
      4. means for gripping said wire-type solder, and for pulling said solder wire from said container and through said stationary hollow metallic tube, and for preventing the return of said solder wire to said container, wherein this said means is removably positioned at said second end of said stationary hollow metallic tube, and wherein this said means includes two oppositely disposed complementary jaws;
      5. and. means for gripping said wire-type solder, and for pulling said solder wire through said movable hollow-metallic tube. and also for preventing the return of said solder wire to said stationary hollow metallic tube, and further for holding said solder wire ready for, and during, use. wherein this said means is remov-positioned at said second end of said movable hollow metallic tube, and wherein this said means includes two oppositely disposed complementary jaws:
   c. and, means for releasably connecting said holding, guiding, and dispensing subassembly to said container, wherein this said means is located intermediate of said holding, guiding, and dispensing means and of said outlet of said container, and wherein said releasably connecting means permits the free passage therethrough of said solder wire.

2. A wire feeder assembly, as set forth in claim 1, wherein said stationary hollow metallic tube of said holding, guiding, and dispensing subassembly is made of brass.

3. A wire feeder assembly, as set forth in claim 1, wherein said hollow tube liner of non-abrasive material of said holding, guiding, and dispensing subassembly is made of a synthetic resin polymer material.

4. A wire feeder assembly, as set forth in claim 1, wherein said slideably movable hollow metallic tube of said holding, guiding, and dispensing subassembly is made of brass.

5. A wire feeder assembly, as set forth in claim 1, wherein said releasably connecting means includes a solder wire passageway through said means, with said passageway having a liner made of a synthetic resin polymer material.

* * * * *